United States Patent [19]

Hollingsworth

[11] 4,151,259

[45] Apr. 24, 1979

[54] USE OF OIL-WATER EMULSIONS IN A HYDROTHERMAL PROCESS

[75] Inventor: Clinton A. Hollingsworth, Lakeland, Fla.

[73] Assignee: Borden, Inc., Columbus, Ohio

[21] Appl. No.: 890,120

[22] Filed: Mar. 27, 1978

Related U.S. Application Data

[63] Continuation-in-part of Ser. No. 779,770, Mar. 31, 1977, abandoned.

[51] Int. Cl.$^2$ ............................................... C01F 1/00
[52] U.S. Cl. ...................................... 423/167; 431/4
[58] Field of Search ............... 423/167, 176, DIG. 16; 431/4; 110/1 P; 44/51

[56] References Cited

U.S. PATENT DOCUMENTS

| | | |
|---|---|---|
| 2,839,361 | 6/1958 | Hollingsworth et al. ............ 423/167 |
| 3,076,248 | 2/1963 | Darrow et al. ....................... 423/167 |
| 3,364,008 | 1/1968 | Hollingsworth et al. ............ 423/167 |

FOREIGN PATENT DOCUMENTS

| | | | |
|---|---|---|---|
| 466326 | 7/1950 | Canada .................................... 423/167 |
| 2027971 | 12/1971 | Fed. Rep. of Germany ............. 44/51 |

*Primary Examiner*—O. R. Vertiz
*Assistant Examiner*—Wayne A. Langel
*Attorney, Agent, or Firm*—George A. Kap; George P. Maskas; Daniel D. Mast

[57] ABSTRACT

This invention relates to hydrothermal processes, such as defluorination of phosphate rock, wherein the novel feature resides in the use of an emulsion of water and fuel oil.

9 Claims, No Drawings

USE OF OIL-WATER EMULSIONS IN A HYDROTHERMAL PROCESS

This is a continuation-in-part of application Ser. No. 779,770 filed Mar. 31, 1977 now abandoned.

This invention relates to the use of an emulsion of water and oil in relatively high temperature processes where burning of fuel takes place in conjunction with evolution, generation, and/or introduction of water vapor which has a beneficial effect on the resulting product and/or manufacturing equipment. This is particularly suited for defluorination of phosphate rock where a feed charge of particulate material is heated by burning fuel oil which produces high flame temperature. The high flame temperature, in conjunction with the requirement of heating the charge relatively close to its fusion temperature to obtain efficient commercial defluorination with conventional means of water addition, causes fusion and balling of the particulate material and severe erosion of the refractory linings in fluid bed reactors, rotary kilns and other related equipment.

It has been discovered that when emulsions of water and oil are combusted in the usual manner, the problems of the prior art hydrothermal processes are overcome since water introduced as an emulsion constituent undergoes explosive vaporization during emulsion combustion, thus permeating the feed charge more efficiently than water vapor added via conventional methods, and effectively suppresses flame temperature which reduces fusion and balling of the particulate feed, erosion of the refractory linings in the process equipment and results in a particulate product having relatively fine porous particles with a substantial reduction in oversize.

Natural deposits of phosphate rock generally occur in the apatite form which contains about 3 to 4% flourine. To render this phosphate suitable as a feed supplement and as fertilizer, it is desirable to increase the phosphorus to fluorine ratio to at least 100 to 1 by reducing fluorine content thereof to below about 0.18% for phosphate products containing about 41% $P_2O_5$ or 18% phosphorus. To accomplish this, mined phosphate rock is treated at relatively high temperature in equipment such as fluid bed reactors and rotary kilns whereby fluorine content thereof is reduced to less than about 0.18%, in a preferred embodiment.

As applied specifically to defluorination, phosphate rock mixed with defluorinating agents, such as phosphoric acid, soda and silica, has been defluorinated since about 1944. Numerous patents have issued in this field purportedly to improve defluorination rate, reduce tendency of charge to ball up, reduce excessive coating build-up, reduce melting or spalling of refractory linings, and to produce a product having finer porous particles with a great reduction in oversize. Although major improvements have been made, none of the patents teach a method of eliminating substantially all tendency of the feed to fuse and ball up nor elimination of refractory problems due to spalling, fusion or melting nor making a product with finer porous particles with a substantial reduction in oversize.

This invention makes it possible to overcome or reduce problems mentioned above by burning water and oil emulsions. Amount of water in the emulsion is controlled so that flame temperature is suppressed to a point where fusion and melting of the charge and of the refractory due to localized overheating are essentially eliminated. Concurrently, increased permeation of the charge by water vapor from the emulsion aids defluorination, reduces fuel consumption per ton of product due to increased defluorination efficiency, and enables production of finer porous particles thus reducing grinding costs dramatically.

It is, therefore, an object of this invention to use emulsions of water and oil to suppress flame temperature when they are combusted in the usual manner and thereafter bringing into contact the products of combustion with a particulate feed to obtain advantages of improved defluorination and fuel economy, increased production and product quality, and reduction of balling of the particulate feed and spalling of the refractory walls.

Improved defluorination is obtained in my process by virtue of the water vapor liberated during emulsion combustion. Water vapor must permeate the feed being processed in order for defluorination reactions to occur at a rate which is commercially feasible. For example, it should be obvious to those skilled in the art, that defluorination of low porosity feeds is more difficult than defluorination of high porosity feeds. Higher temperatures and longer processing times are required for equivalent results due to decreased porosity. This is thought to occur because diffusion of water vapor into the material being processed is impeded by lack of porosity.

Conversely, it is thought that by increasing the efficiency with which a given concentration of water vapor permeates the material being processed, as I have done in the present invention with the use of emulsions, lower operating temperatures and shorter processing times are attained in successful defluorination. It is this increased defluorination efficiency, based on water vapor mobility considerations, which permits the suppression of flame temperature to a point where fusion and balling of the charge are essentially eliminated without sacrificing throughout. While absolute thermal efficiency decreases when large amounts of water are emulsified with fuel oil, the discovery has been made that overall process efficiency increases when water and oil emulsions are combusted due to increased defluorination efficiency. This increased defluorination efficiency more than compensates for the thermal losses associated with the combustion of emulsions containing in excess of about 15 to 20% water.

Combustion of fuel oil and water emulsions, as compared to combustion of fuel oils, improves atomization, decreases combustion time, reduces soot formation and reduces downtime of the equipment due to lesser erosion of refractory lining as a result of lower flame temperatures. A concurrent increase in thermal efficiency has been reported in ASME paper 75-WZ/APC-1 by Robert E. Hall, EPA Research at Triangle Part in N.C. for fuel oil emulsions containing less than about 17% water. This is apparently due to the fact that additional BTUs invested in heating and vaporizing the microdroplets of water imbedded in the fuel are offset by a more complete combustion of the fuel at low levels of excess air resulting in a net gain in thermal efficiency on the order of 1 to 3%. At levels exceeding about 15 to 20% water by volume, depending on type of fuel, atomization technique, water droplet size and fuel temperature, thermal efficiency declines as expected, based on thermodynamic considerations. Under these conditions, thermal advantages gained by a more complete combustion of fuel oil are offset by increased BTUs required to heat and vaporize the larger volume of water present in the emulsion.

While significant work has been accomplished by others concerning possible benefits of emulsions as fuels, these investigations have centered on thermal and environmental advantages, such as slight increases in thermal efficiency and reduced soot formation, rather than process improvements based on water vapor distribution and flame temperature suppression associated with normal combustion of emulsions containing sufficient amounts of water. For example, in cement production, feed particles become momentarily tacky at about 2500° F. which causes accumulation of deposits on refractory walls. Reduction of flame temperature by the use of emulsions, as described herein, reduces said deposits in addition to providing other benefits to process equipment resulting from lower flame temperatures. It is believed that successful application of emulsions to cement processing is definitely possible, for reasons which are not limited to slightly increased thermal efficiency and reduced soot formation.

The use of water-in-oil emulsion fuel in various applications, but not defluorination, dates back nearly twenty years. Examples of pertinent technical literature includes Cottell U.S. Pat. No. 3,749,318 which discloses the use of water-in-oil emulsion containing 10 to 50% water in internal combustion engines; Cottell U.S. Pat. No. 3,941,552 which discloses a dispersion of oil, water and pulverized coal for burning in a furnace; German patent No. 2,027,971 which discloses the use of oil and water emulsions containing 3 to 30% water to fire shaft kilns used to calcine limestone; and Austrian patent No. 190,034 which teaches the use of such emulsions containing 3 to 40% water as a liquid fuel to obtain considerably higher temperatures and heating performance per kilogram of the fuel.

While phosphate defluorination cannot be accomplished in shaft kilns, it is interesting to note that on page 6 of the German patent it is disclosed that flame temperature in lime shaft kilns fired with fuel oil and water emulsion is between 900° and 1100° C. or 1652° to 2012° F., which is consonant with the disclosure on page 1 of this patent where it is noted that combustion temperature in the region of limestone should not exceed 1300° C., or 2372° F. In the context of this disclosure, it is important to recognize that flame temperature of No. 6 fuel oil is about 3300° F. and that for No. 5 fuel oil is about 3100° F. The reason for such low flame temperatures of 1652° to 2372° F. disclosed by the German patent is that combustion of fuel oil, as disclosed in the German patent, is carried out with a deficient or less than stoichiometric amount of air. As to the Austrian patent, although it states that higher combustion temperatures are possible with oil and water emulsions containing 3 to 40% water, and preferably only 10 to 20%, it can be shown that higher combustion temperatures for such emulsions can be obtained when such emulsions contain less than about 20% water whereas combustion temperatures are reduced using emulsions containing in excess of about 20% water.

Research has established that when process water is supplied as an emulsion constituent, defluorination characteristics are significantly improved in both the rotary kilns and fluid bed reactors. It is believed that the increase in defluorination efficiency, using emulsions as opposed to natural gas and/or fuel oils, results from a more efficient permeation of the feed charge by water vapor. Water vapor liberated when the emulsion is combusted is explosively driven into the feed charge. On a microscopic scale, a phosphate particle being defluorinated is exposed to more water vapor which is present in the immediate vicinty, therefore, defluorination is more easily accomplished.

Defluorination is a diffusion limited process. Water vapor must permeate the feed being processed for defluorination reactions to occur. Without the presence of water vapor at the point of reaction, defluorination cannot occur. For this reason, the use of emulsions in the defluorination process results in enhanced reaction kinetics which cannot be achieved at similar temperatures and water addition rates with conventional techniques.

As is known to those skilled in the defluorination art, firing of fluid bed reactors with straight fuel oil is problematic for a number of reasons which are characteristic of the fuel. Also, firing of fluid bed reactors with straight fuel oil results in drastic decline in production relative to natural gas operation. In order to alleviate these problems, fluid bed reactors are generally fired with natural gas or a combination of fuel oil and natural gas, when it is desired to use fuel oil. It appears that natural gas contributes to an improved water vapor distribution and attainment of other advantages as compared to straight fuel oil. Even when natural gas is used in conjunction with fuel oil, however, decline in production can be as high as 25%, which represents an enormous loss.

Pilot fluid bed reactors have demonstrated successful defluorination with emulsions containing as little as 20% water by volume. Feed rates achieved with emulsions, which are an indication of defluorination efficiency, were highest ever at normal space rates. Operation of the reactor with the emulsions also produced a product which did not have the usual glazed appearance and the operation was marked by advantages which are enumerated herein, including lower cost, less balling of the feed, etc. Absence of the glazed appearance on the product probably reflects better phosphorus availability. The dramatic improvement in particle size uniformity and reduction in oversize was not realized with the fluid bed reactor when compared to rotary kiln operation since fluid bed reactors produce a particulate product which has good particle size uniformity.

In rotary kilns, it has been possible, with the use of emulsions, to adjust temperature so that the charge does not ball up due to overheating in the hot zone and refractory is not eroded due to high temperature flame impingement. The resulting kiln product is composed primarily of small granules. It is lower in density and reddish in color as opposed to the normal salt and pepper defluorinated phosphate produced with fuel oil or natural gas. Oversize material occassionally produced with emulsions is composed of distinct granules weakly aggregated into discreet shapes requiring much less energy to crush than fused balls produced using standard techniques.

The emulsion that is the subject of this invention contains in excess of about 5 volume percent water and preferably in excess of about 20% water and up to about 60% water. Emulsions containing 57% water have been tried on production size rotary kilns and were found to be eminently suitable and for this reason, it is believed that emulsions containing up to 70% or more water may be operable. Suitable emulsions can be prepared using residual oils such as No. 5 or No. 6, or with distillate oils. Residual oils are currently preferred due to economic considerations, in addition to the fact that said oils contain natural emulsifiers which have a beneficial effect on emulsion stability. In the case of water in oil emulsions, coarse emulsions with water particle sizes of about 15 to 40 microns, and fine emulsions with water particle sizes of 2 to 4 microns, were found to be suitable. The fine emulsions are preferred, however, since they are more stable relative to the coarse emulsions which can experience substantial phase separation upon standing. The emulsion can be prepared in any known manner, as by mixing water with fuel oil in or by any standard mechanical mixing device and recirculating same until it becomes homogeneous. To obtain a finer emulsion, the coarse emulsion, prepared as described above, can be passed through an ultrasonic or mechanical device which reduces the water particle size from about 15–40 microns to about 2–4 microns. Alternatively, the fine emulsion can be prepared in a single step. Emulsions of water and residual fuel oils are preferably maintained at a temperature above 100° F., otherwise, gelling may occur at temperatures below about 100° F.

Defluorination of phosphate rock can generally be accomplished at a temperature of about 2700° to 2750° F. in rotary kilns and at 2450° to 2600° F. in fluid-bed reactors. It should be evident to those skilled in the art that lower operating temperatures required in fluid bed reactors, as compared to rotary kilns, result from more efficient water vapor contact with the particulate feed being processed. Since fusion temperature of phosphate rock is about 2800° F., considerable balling of the feed takes place in view of the fact that flame temperature of No. 6 fuel oil is about 3300° F. and that for No. 5 fuel oil is about 3100° F. With the use of emulsions, as described herein, the problems described above can be reduced or eliminated since flame temperature of emulsions can be suppressed through the addition of sufficient amounts of water, which acts as a heat sink during combustion.

A typical plant phosphate feed, in the processing of which fuel oil is combusted, has the following approximate composition:

83% phosphate rock.
10% $P_2O_5$ (preferably added as phosphoric acid).
7% $Na_2O$.

Unavoidable variations in chemistry of the feed used for defluorination due to the nature of phosphate deposits, as well as intentional adjustments to feed chemistry made to achieve desired product grades and/or enhance process efficiency, are anticipated. It is thought that percent water in emulsion needed to optimize defluorination will vary according to the chemical composition of the feed being processed.

The following examples of the invention, while not intended to be taken as limiting the scope thereof, will serve to illustrate the process described herein.

EXAMPLE 1

The pilot fluid bed reactor used in this experiment was of conventional cylindrical design, 45 inches I.D. and 25 feet in height as measured from the grid to the top of the reactor. The reactor grid consisted of 19 fluidizing ports spaced 9 inches center-to-center in a regular hexagonal pattern.

The first successful defluorination run was conducted with emulsions containing 20% water and 80% fuel oil. Emulsion preparation was accomplished using a Waukesha Foamer Pump. Although relatively good defluorination results were achieved, emulsion produced by this method was relatively coarse and inconsistent in dispersed phase particle size. Mechanical problems encountered during initial tests resulted in operation at less than optimum conditions. Feed rates up to 800 lbs. were achieved. Following are chemical analyses:

|  | P | Ca | $Na_2O$ | $SiO_2$ | F | % of Total P Soluble in 2% Citric Acid |
|---|---|---|---|---|---|---|
| Plant Feed | 16.20 | 28.30 | 6.52 | 2.35 | 3.10 | N/A |
| Emulsion Clinker | 18.34 | 31.55 | 7.61 | 3.13 | 0.15 | 92.32 |

Another pilot fluid bed reactor run was made using 20% water and 80% fuel oil subsequent to the above test. Emulsion preparation was accomplished using a Waukesha Foamer Pump with a recycle system. Batch preparation of emulsion was employed to insure uniformity over the test period. The average feed rate was 875 lbs/hr. Fuel consumption was 28.5 GPH of No. 5 fuel oil. Average fluorine for all clinker produced was 0.13%. By increasing fluidizing air from a normal of 675 CFM to about 725 CFM, feed rates above 1000 lbs/hr could be maintained. Minimal coating was noted on reactor walls during visual inspection after shutdown.

EXAMPLE 2

The pilot fluid bed reactor used in this experiment was of conventional cylindrical design, 45 inches ID and 25 feet in height as measured from the grid to the top of the reactor. The reactor grid consisted of 19 fluidizing ports spaced 9 inches center-to-center in a regular hexagonal pattern. Emulsion was prepared by mixing 53.33 gallons of water with 160 gallons of No. 5 fuel oil in a mechanical foamer pump to form a coarse emulsion having water particle size of 15–40 microns. The coarse emulsion was recycled through the pump until it became homogeneous and then was fed through an ultrasonic Triplex 1000-A Sonolator which, in a single pass, reduced water particle size to about 2–4 microns. The final emulsion was then transferred to a surge tank which supplied fuel to the burners. Oil preheat temperature was maintained at 130°–150° F. in the recycle tank and emulsion preheat was maintained a 150°–175° F. in a surge tank.

Three loads of plant feed were used during the test, composition of which was as follows, in weight percent:

| Amount | $P_2O_5$ | CaO | $Na_2O$ | $SiO_2$ | F |
|---|---|---|---|---|---|
| 10 tons | 36.11 | 39.79 | 9.77 | 2.53 | 3.10 |
| 12 tons | 36.21 | 40.91 | 9.84 | 2.33 | 3.25 |
| 12 tons | 36.31 | 40.91 | 9.72 | 2.41 | 3.20 |

The pilot fluid bed reactor was fired with 25% water-in-oil emulsion described above by establishing a fluid bed of the particulate feed and operating the reactor in a known manner. Correlation of average bed temperature, the average percent of fluorine in the clinker and the average feed rate, is given below:

| Avg. Bed Temp. °F. | Avg. %F in clinker | Avg. Feed Rate lbs/hr | |
|---|---|---|---|
| 2457 | 0.06 | 669.63 | |
| 2522 | 0.06 | 705.5 | |
| 2501 | 0.10 | 849.5 | |
| 2537 | 0.10 | 992.08 | (Supplemental |

| | Avg. Bed Temp. °F. | Avg. %F in clinker | Avg. Feed Rate lbs/hr |
|---|---|---|---|
| | | | Air Used) |

The bed temperature was measured with a thermocouple.

The following are chemical and screen analyses of clinker or product, as it can otherwise be referred to, in weight percent:

| | | | | | | Total P Soluble in | |
|---|---|---|---|---|---|---|---|
| $P_2O_5$ | CaO | $Na_2O$ | $Si_2$ | F | 0.4% HCL | 2.0% Citric Acid | NAC |
| 41.28 | 43.80 | 7.81 | 3.39 | 0.08 | 98.79 | 96.15 | 93.99 |

In above table, NAC is the acronym for neutral ammonium citrate.

| Clinker Screen Analysis | | | | | | |
|---|---|---|---|---|---|---|
| Screen Mesh Size | +10 | 10×14 | 14×20 | 20×35 | 35×65 | −65 |
| Weight % | 23.0 | 26.6 | 29.0 | 19.0 | 2.0 | 0.4 |

Successful defluorination was accomplished at feed rates up to 960 lbs/hr with normal air flows, which was the highest ever achieved in the pilot reactor under such conditions. Maximum feed rate obtained was 1225 lbs/hr on short term with supplemental air applied; however, fluorine content slightly exceeded the desired 100:1 phosphorus to fluorine ratio after increasing feed to this rate. Emulsion quality was consistent during the entire run. A brief test was made to evaluate the difference between burning a coarse (15–40 micron) emulsion as opposed to a fine (2–4 micron) emulsion and results showed no difference in product. Estimated energy consumption was 107 therms per ton of feed treated, averaged over the entire run. Product density was approximately 60 pounds per cubic foot.

EXAMPLE 3

A pilot rotary kiln was used in this example to defluorinate phosphate rock. Dimensions of the kiln are 27 inches ID, 40 feet long with about ¼ inch per foot inclination. Speed of the kiln was about 3 RPM. In order to increase retention time during this run, two dams were installed in the kiln, the first 18 inches from the discharge and the second 11 feet 8 inches from the feed end. A 1½ inch feed pipe with a 2½ inch water cooled sleeve was installed horizontally in the rear of the kiln. This feed pipe was connected to an MSA blower and feed was air-injected into the kiln through the feed pipe. This was done because feed being tested had a tendency to stick up in the rear of the kiln when fed by means of a gravity feed pipe, as is customary. Feed injection greatly decreased this sticking problem. A standard air-aspirated oil burner was used to atomize the emulsion with additional low pressure air supplied around the outside of the nozzle at the rate of about 35–40 SCFM.

The start-up was accomplished using 25% water-in-oil emulsion which was prepared by aspirating 53.33 gallons of water into 160 gallons of No. 5 fuel oil in a steam jacketed recycle tank by means of an open face centrifugal pump, which recycled the mixture continuously. Oil preheat temperature was 130°–150° F. The resulting coarse emulsion was of marginal quality with water particle size varying from several microns to greater than 40 microns and with substantial phase separation taking place after the emulsion stood overnight. The coarse emulsion was fed in a single pass to a Sonolator Triplex 1000-A ultrasonic unit which produced a stable emulsion with water particle size in the range of 2–4 microns. Final emulsion was pumped to a surge tank where it was held at 150°–175° F. Emulsion from the surge tank was pumped directly to an air-aspirated oil burner through a Kates variable orifice flow regulator. Inlet pressure on the Kates flow regulator was held at about 60 psi.

During this test, the water in the water-in-oil-emulsion was varied from 25–40% in increments of 5% to evaluate defluorination efficiency as a function of percent water. A small amount of quench water was added to clinker just prior to discharge in order to increase availability. A plant feed was used for the duration of the test, chemical analysis of which was as follows, in weight percent:

| Amount of Feed | $P_2O_5$ | CaO | $Na_2O$ | $SiO_2$ | F |
|---|---|---|---|---|---|
| 3 tons | 36.34 | 40.57 | 6.15 | 3.31 | 2.75 |
| 20 tons | 36.74 | 40.70 | 6.61 | 2.60 | 3.10 |
| 10 tons | 37.24 | 40.57 | 6.35 | 2.46 | 3.20 |

The following chemical and screen analyses provide a quantitative comparison of the kiln product as a function of percent water in emulsion:

| | % Water in Emulsion | | | |
|---|---|---|---|---|
| | 25% $H_2O$ | 30% $H_2O$ | 35% $H_2O$ | 40% $H_2O$ |
| $P_2O_5$ | 41.43 | 41.53 | 41.78 | 41.53 |
| P | 18.08 | 18.12 | 18.23 | 18.12 |
| CaO | 44.53 | 44.53 | 43.80 | 45.08 |
| $Na_2O$ | 7.22 | 7.60 | 7.33 | 7.13 |
| $SiO_2$ | 3.17 | 3.05 | 3.07 | 3.05 |
| F | 0.06 | 0.04 | 0.06 | 0.04 |
| Percent total P soluble in | | | | |
| 0.4% HCl | 99.16 | 100.0 | 98.58 | 99.88 |
| 2.0% Citric Acid | 96.17 | 96.77 | 96.79 | 97.13 |
| NAC | 92.09 | 94.98 | 94.18 | 93.91 |
| Screen Analysis | | | | |
| U.S. Mesh 10 | 10.1 | 12.2 | 12.3 | 9.3 |
| 14 | 11.3 | 11.8 | 12.7 | 10.9 |
| 20 | 23.1 | 22.5 | 25.0 | 22.3 |
| 35 | 41.3 | 40.0 | 39.7 | 43.3 |
| 65 | 10.9 | 9.8 | 8.3 | 10.5 |
| −65 | 3.3 | 3.7 | 2.0 | 3.7 |

Installation of dams within the kiln to increase retention time appeared to produce a more consistent product as regards fluorine. One of the most significant results of this test was the particle size distribution of clinker produced. Product was very similar to that currently produced by fluid bed reactors, with very little oversize. The ability to consistently produce clinker such as that obtained during this test results in substantial energy savings due to a reduction in grinding. Product density varied from 51 lbs/cu. ft. to 67 lbs/cu. ft.

Results obtained from this test showed that it is possible to produce a consistently low fluorine product at high feed rates. Highest average feed rates were obtained between 30–35% water and were 600 lbs/hr and 593 lbs/hr, respectively. Tests conducted with 40% emulsion were too short to provide accurate performance data. Energy consumption averaged over the entire run (including start-up) was approximately 95 therms per ton of feed, which is unusually low for a small pilot kiln.

EXAMPLE 4

Full scale tests using fuel oil emulsions for defluorination were conducted on a small production rotary kiln over a period of about five months. Scale-up from the small 27" ID pilot rotary kiln to a 66" ID production kiln required a significant increase in percent water to optimize the process. While successful results in the pilot kiln were achieved with emulsions containing as little as 25% water, optimization of the process in the production unit required emulsions with water in the 40-60% range. Higher percent water in emulsion was anticipated based on the proposition that increased defluorination efficiency results from increased permeation of the charge by water vapor liberated during emulsion combustion. It was assumed that in a larger diameter kiln, permeation of the charge due to the explosive release of water vapor would be somewhat muted due to the increased radial distance between the flame proper, centered along the axis of the kiln, and the feed being processed along the kiln walls, plus the fact that axial velocity of combustion gases increases in going from the pilot kiln to a production kiln. Experimental results support this assumption. Similar increases in percent water required for fluid bed reactors of commercial size are not anticipated since fuel is distributed evenly across the entire grid as opposed to a rotary kiln where localized combustion along the axis of the unit occurs.

The following chart is a summary of data collected hourly over the period of about five months and shows a direct comparison between kilns 3 and 4, operating on straight fuel oil, and kiln 5 fired with water-in-oil emulsions. All three kilns had identical dimensions, received feed from the same hopper, and were operated using a common draft system. As is standard procedure throughout the plant, all three kilns were operated at maximum feed rates possible while still maintaining an acceptable product of less than 0.18% fluorine. This means that increased feed rates noted wiith fuel oil emulsions represent an increase in defluorination efficiency. The three kilns are substantially identical and were operated at substantially the same conditions with the exception, of course, that kilns 3 and 4 were fired with straight fuel oil whereas kiln 5 was fired with an emulsion of fuel oil and water, as indicated.

| | FEED | | | | | | |
|---|---|---|---|---|---|---|---|
| | % H$_2$O in emulsion | Daily Feed Hours | Tons/ Hour | Total Tons | Recycle Tons/Hr | Fuel Oil GPH | %F |
| No. 3 Kiln | | | | | | | |
| 12/16-12/31 | 0 | 22.4 | 2.77 | 991.2 | 0.16 | 147.3 | 0.26 |
| 1/1-1/24 | 0 | 22.5 | 2.93 | 1,583.1 | 0.15 | 171.1 | 0.19 |
| 1/25-2/21 | 0 | 21.3 | 3.15 | 1,879.5 | 0.27 | 164.2 | 0.12 |
| 2/22-3/28 | 0 | 22.3 | 3.14 | 2,455.3 | 0.28 | 170.5 | 0.14 |
| 3/29-4/25 | 0 | 22.5 | 3.22 | 2,029.4 | 0.28 | Oil 161.4GPH Gas 243.6CFH | 0.16 |
| 4/26-5/16 | 0 | 21.6 | 3.24 | 1,399.5 | 0.22 | Oil 141.9GPH Gas 231.6CFH | 0.11 |
| Composite Avg. | 0 | 22.1 | 3.10 | 10,338.0 | 0.24 | Oil 2,373 Hrs. at 163.7 GPH Gas 699 hrs. at 237.8 CFH | 0.16 |
| No. 4 Kiln | | | | | | | |
| 12/16-12/31 | 0 | 21.4 | 3.28 | 1,121.5 | 0.17 | 144.0 | 0.09 |
| 1/1- 1/24 | 0 | 20.6 | 2.73 | 1,182.3 | 0.16 | 138.8 | 0.29 |
| 1/25-2/21 | 0 | 22.5 | 3.08 | 1,939.9 | 0.26 | 163.8 | 0.12 |
| 2/22-3/28 | 0 | 21.3 | 3.00 | 2,237.8 | 0.28 | 151.0 | 0.14 |
| 3/29-4/25 | 0 | 21.0 | 3.18 | 1,864.9 | 0.27 | Oil 160.4 Gas 219.4CFH | 0.21 |
| 4/26-5/15 | 0 | 22.4 | 3.00 | 1,343.4 | 0.22 | Oil 146.3 Gas 230.2CFH | 0.17 |
| Composite Avg. | 0 | 21.5 | 2.98 | 9,689.8 | 0.24 | Oil 2,721 Hrs. at 151.3GPH Gas 744 Hrs. at 224.3CFH | 0.17 |
| No. 5 Kiln | | | | | | | |
| 12/16-12/31 | 47.1 | 21.3 | 3.45 | 1,176.2 | 0.25 | 164.4 | 0.12 |
| 1/1-1/24 | 50.5 | 22.2 | 3.50 | 1,864.6 | 0.22 | 166.6 | 0.22 |
| 1/25-2/21 | 53.8 | 22.0 | 3.91 | 2,148.2 | 0.19 | 177.4 | 0.13 |
| 2/21-3/28 | 52.6 | 21.2 | 3.48 | 2,588.2 | 0.17 | 183.2 | 0.15 |
| 3/29-4/25 | 54.8 | 22.6 | 3.46 | 2,192.8 | 0.29 | 181.1 | 0.21 |
| 4/26-5/15 | 52.7 | 21.6 | 3.40 | 1,468.4 | 0.35 | 177.0 | 0.13 |
| Composite Avg. | 51.9 | 21.8 | 3.47 | 11,438.4 | 0.24 | 176.3 | 0.16 |

Considerable time was spent varying process parameters in order to identify optimum operating techniques. Unfortunately, most of the variables tested achieved negative results and caused degraded system performance. Data reported above was tabulated without regard to these factors, therefore, results listed are conservative. Still, a 14% increase in feed rate, averaged over the entire run, was noted concurrent with the production of clinker with better physical characteristics.

EXAMPLE 5

A more accurate picture of benefits associated with emulsion fired rotary kilns is evident by inspection of the following data, tabulated during a 5-day period from the preceeding example when operating parameters were stabilized near desired levels. Fuel oil used here was No. 5 fuel oil, as in other examples, unless otherwise noted. Results of this run are set forth below:

| No. 3 Kiln (fuel oil) | | | | | | % Wt. Recovery |
|---|---|---|---|---|---|---|
| Feed | | Clinker | | | | |
| T/Hr. | Therms/T. | T/Hr. | F | Therms/T | | |
| 2.97 | 84.0 | 2.24 | 0.03 | 106.3 | | 78.6 |
| 4.02 | 57.2 | 3.63 | 0.71 | 63.3 | | 91.2 |
| 2.97 | 70.8 | 2.71 | 0.07 | 77.6 | | 90.9 |
| 2.89 | 82.4 | 2.30 | 0.04 | 103.5 | | 79.7 |
| 3.60 | 64.2 | 3.28 | 0.08 | 70.4 | | |
| Ave. 3.34 | 69.4 | 2.90 | 0.25 | 79.4 | | 87.4 |
| No. 4 Kiln (fuel) oil) | | | | | | |
| 2.70 | 87.0 | 2.83 | 0.02 | 83.0 | | 104.8 |
| 3.85 | 59.6 | 3.65 | 0.08 | 62.8 | | 94.8 |
| 3.70 | 60.6 | 3.22 | 0.20 | 69.6 | | 86.8 |
| 3.52 | 66.8 | 3.17 | 0.20 | 74.2 | | 90.1 |
| 3.40 | 65.7 | 2.73 | 0.26 | 80.3 | | |
| Ave. 3.42 | 67.0 | 3.11 | 0.14 | 73.5 | | 90.9 |
| No. 5 Kiln (emulsion) | | | | | | |
| % H$_2$O | | | | | | |
| 53.8 | 4.49 | 55.0 | 4.33 | 0.11 | 57.0 | 96.5 |
| 54.2 | 4.84 | 50.6 | 4.15 | 0.12 | 59.0 | 85.6 |
| 54.9 | 3.91 | 63.1 | 3.40 | 0.08 | 72.6 | 86.9 |
| 54.7 | 4.51 | 53.6 | 3.87 | 0.06 | 62.6 | 85.6 |
| 56.3 | 4.64 | 51.8 | 3.74 | 0.12 | 64.2 | 80.6 |
| Avg. | 4.44 | 54.9 | 3.82 | 0.10 | 63.3 | 86.7 |
| Avg. for 3&4 | 3.38 | 68.2 | 3.01 | 0.20 | 76.4 | 89.2 |
| % (Baseline to FOE) | 31% | −20% | 27% | N/A | −17% | −3% |

As is apparent from the above table, the feed rate increased 31% in No. 5 kiln, where the emulsion was used, as compared to kilns No. 3 and 4, where straight fuel oil or in combination with natural gas was used. Increase in feed rate was accomplished with a 20% reduction in therms of energy per ton of feed. On the product side, the results were equally impressive; an increase of 27% in clinker production with 17% reduction in therms per ton of clinker. There was a slight decrease of 3% in recovery for No. 5 kiln. Overall, results shown in the table above are no less than dramatic.

Some of the most significant results noted with fuel oil emulsions were the physical characteristics of the clinker produced. Emulsion clinker is composed primarly of small granules, reddish in color as opposed to normal salt and pepper clinker produced with natural gas or fuel oil. Density is lower, approximately 76 lbs/cu. ft. as compared to approximately 88 lbs/cu. ft. By far the most significant change in physical characteristics was the dramatic shift in particle size distribution of clinker produced using fuel oil emulsions. Clinker produced with current rotary kiln technique contains significant amounts of oversize material (+12 mesh) which must be ground prior to shipment. Grinding not only consumes costly electrical energy but also generates unwanted fines.

In addition to increased defluorination efficiency, other important side effects were noted when using fuel oil emulsions in the defluorination process. Reduced flame temperature associated with emulsion combustion at percent water levels used resulted in a substantial decrease in shooting required to remove fused material from kiln walls. It is thought, however, that savings due to decreased shooting would be at least partially offset by increased electrical consumption associated with emulsion combustion equipment.

EXAMPLE 6

Samples of clinker were taken hourly from kilns 3, 4 and 5 during the period 3/29/77 to 5/15/77 for screen analysis. Samples from kilns 3 and 4 were taken from discharge of the kilns and samples from kiln 5 were taken from the dragchain discharge. The data set forth below provides particle distribution of the clinker from the three kilns. As shown by the calculations below, substantial savings in grinding costs due to the better particle distribution are realized due to the use of the emulsion. Based on my experience with rotary kiln, such results cannot be obtained when using natural gas or straight fuel oil.

| COMPOSITE SCREEN ANALYSIS 3/29/77–5/15/77 | | | |
|---|---|---|---|
| US Mesh Size | Kiln 3 | Kiln 4 | Kiln 5 |
| +½″ | 34.15% | 35.87% | 6.89% |
| ½″ × 12 | 28.11 | 26.07 | 11.20 |
| 12 × 16 | 7.06 | 6.03 | 7.13 |
| 16 × 20 | 7.59 | 7.01 | 11.02 |
| 20 × 40 | 16.59 | 17.10 | 37.44 |
| 40 × 100 | 5.77 | 7.03 | 21.66 |
| 100 × 200 | 0.30 | 0.37 | 1.99 |
| −200 | 0.45 | 0.38 | 2.32 |

Assume: $1.64/ton Grinding costs based on tons actually ground, neglecting on-size recycle.
Assume: 25% fines generation during grinding process.
Assume: 100 tons of clinker discharge.
For #3 kiln we have:

Oversize (+ 12 mesh) = 34.15 + 28.11 = 62.26 tons $$\frac{62.26 \text{ tons oversize}}{100 \text{ tons CDP}} \times \frac{\$1.64}{\text{ton oversize ground}} = \frac{\$102.11 \text{ grinding cost per 100 tons clinker discharge}}{}$$

$$\frac{62.26 \text{ tons oversize}}{100 \text{ tons clinker}} \times \frac{0.25 \text{ tons dust}}{\text{ton oversize ground}} = \frac{15.57 \text{ tons dust during grinding per 100 tons clinker produced}}{}$$

Total clinker fines generated, including grinding = 15.57 tons + 0.45 tons = 16.02 tons per 100 tons clinker produced This converts to a total fines generation of 16.02% for #3 kiln.

Similar calculations were made for kilns 4 and 5. These calculations are summarized below, based on 100 tons of clinker discharge:

| Comparison of grinding costs/fines generation | | | |
|---|---|---|---|
| | #3 kiln | #4 kiln | #5 kiln |
| oversize (+12 mesh) | 62.26 tons | 61.94 tons | 18.09 tons |
| grinding cost | $102.11 | $101.58 | $29.67 |
| total fines after grinding | 16.02% | 15.87% | 6.84% |

This data indicates a 71% decrease in grinding costs along with a 57% decrease in fines generation using emulsion of fuel oil and water as compared to straight fuel oil.

We claim:

1. Process for defluorinating particulate phosphate rock feed comprising the steps of combusting an emulsion of fuel oil and water containing in excess of about 5% water to produce products of combustion, which include water vapor; contacting products of combustion with the particulate feed; and recovering a particulate product.

2. Process of claim 1 wherein the emulsion contains in excess of about 20% water and the particulate feed contains fluorine, most of which is removed when the products of combustion and water vapor contact same.

3. Process of claim 2 including the step of moving the particulate feed along a downwardly inclined surface while passing the products of combustion therethrough and recovering a product having relatively fine porous particles with a substantial reduction of oversize when compared to an operation using straight fuel oil.

4. Process of claim 3 wherein the inclined surface is a rotating cylinder.

5. Process of claim 4 wherein the emulsion contains in excess of about 20% and up to about 70% water.

6. Process of claim 4 wherein the emulsion is combusted with approximately a stoichiometric amount of air and the products of combustion contact the particulate feed while the feed is in motion.

7. Process of claim 2 wherein the emulsion contains up to about 70% water, the particulate feed contains up to about 4% fluorine and the particulate product contains less than about 0.18% fluorine.

8. Process of claim 2 including the step of fluidizing the particulate feed while passing the products of combustion therethrough.

9. Process of claims 8 or 3 wherein the fuel oil is selected from No. 5 fuel oil, No. 6 fuel oil and mixtures thereof.

* * * * *

UNITED STATES PATENT OFFICE
CERTIFICATE OF CORRECTION

Patent No. 4,151,259　　　　　　　　Dated April 24, 1979

Inventor(s) Clinton A. Hollingsworth

It is certified that error appears in the above-identified patent and that said Letters Patent are hereby corrected as shown below:

Col. 11, line 13, under "79.7" add --91.2--;

Col. 11, line 20, change "80.3" to --81.9--;

Col. 11, line 20, under "90.1" add --80.3--.

*Signed and Sealed this*

*Seventeenth* Day of *July 1979*

[SEAL]

Attest:

LUTRELLE F. PARKER

*Attesting Officer*　　*Acting Commissioner of Patents and Trademarks*